No. 875,748. PATENTED JAN. 7, 1908.
C. F. THAYER.
VEHICLE PROPELLING MECHANISM.
APPLICATION FILED APR. 21, 1906.
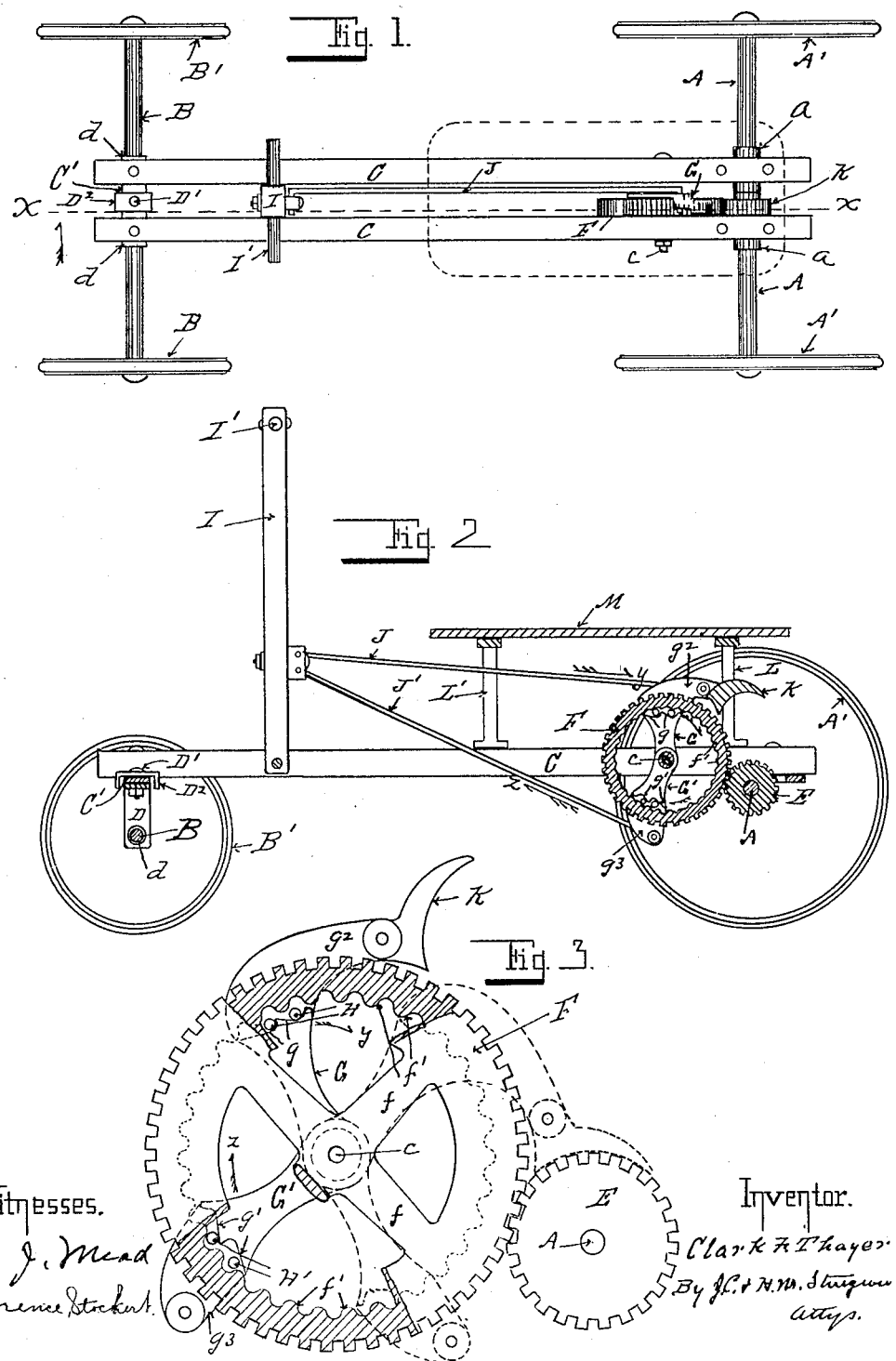

UNITED STATES PATENT OFFICE.

CLARK F. THAYER, OF ERIE, PENNSYLVANIA.

VEHICLE PROPELLING MECHANISM.

No. 875,748.  Specification of Letters Patent.  Patented Jan. 7, 1908.

Application filed April 21, 1906. Serial No. 313,031.

*To all whom it may concern:*

Be it known that I, CLARK F. THAYER, a citizen of the United States, residing at Erie, in the county of Erie and State of Pennsylvania, have invented certain new and useful Improvements in Vehicle Propelling Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to vehicle propelling mechanism, and has for its objects the construction of a propelling mechanism for vehicles in such a manner that it will operate to drive the vehicle forward when the operating lever is moved forward as well as when it is moved backward, and also so that the mechanism will operate as a brake for the vehicle at a certain point in its movement. These and other features of my invention are hereinafter set forth and explained and illustrated in the accompanying drawings in which:

Figure 1 is a top or plan view of a vehicle embodying my invention. Fig. 2 is a longitudinal section of the same on the line $x$—$x$ in Fig. 1. Fig. 3 is an enlarged view partially in elevation and partially in section of the gear and brake mechanism of my invention.

In these drawings A is the rear axle, A' the rear wheels, B the front axle and B' the front wheels of a child's vehicle. The rear axle A is mounted in bearings $a$ at the rear end of a frame, which, in this case, preferably consists of two parallel bars C, said axle rotating freely in said bearings $a$, and having one or both of the wheels A' non-rotatable on said axle, so as to operate as driving wheels.

The front axle B is mounted in bearings $d$ in a spider D upon which a bearing plate C', bolted to the under surface of the front ends of the bars C, rests, and is secured thereto by means of a king-bolt D' which also passes through an inverted U-shaped clip $D^2$ which rests on the top of the bearing-plate C' and operates against the edges of the bearing plate C' and the edges of the top of the spider D to limit the swing of the spider D and the front axle B mounted thereon.

On the rear axle A between the bearings $a$ I place a gear-pinion E which is firmly secured to said axle in any convenient manner, and between the bars C on a suitable bearing $c$ I place a gear wheel F which intermeshes with the pinion E and operates to drive the same. The spokes $f$ of the wheel F are preferably at one edge of the wheel, so that the rim of the wheel F overhangs at one side the said spokes $f$; the inner surface of this overhanging portion is provided with corrugations $f'$ as illustrated in Figs. 2 & 3. On the bearing $c$, or the hub of the wheel which projects under the overhanging portion of the rim thereof, I mount levers G and G' provided with inclined notches $g$ and $g'$ in shoulders thereon, which shoulders extend under the overhanging portion of the rim of the wheel F, and in the notches $g$ and $g'$, I place balls or rollers H and H', which, when the levers are moved in one direction travel up the inclines of the notches $g$ and $g'$ and engage the corrugations $f'$ on the inner surface of the rim of the wheel F and operate to rotate said wheel, the rollers or balls H engaging with the wheel rim and rotating the wheel when the lever G is moved in the direction of the arrow $y$ and become disengaged when moved in the opposite direction, and the rollers or balls H' engaging the wheel rim and rotating the wheel in the same direction, when the lever G' is moved in the direction of the arrow Z, and become disengaged when moved in the opposite direction, so that the operation of said levers G and G' both operate to rotate the wheel F in the same direction.

For operating said levers G and G', I preferably provide a lever I pivoted between the bars C, and having a cross-bar I' at the upper end thereof adapted to be grasped by the hands of the operator. From this lever I, links J and J' pivoted thereto extend to and are pivoted to ears $g^2$ and $g^3$ on the levers G and G', whereby the action of the lever I forward and backward, operates to move the levers G and G' in like manner, and thereby rotate the wheel F.

On an extension of the ear $g^2$ of the lever G, I provide a brake-shoe K which, when the lever G is moved to near the farthermost point of its traverse in the direction of the arrow $y$, comes down upon the top of the gear pinion E, as illustrated by dotted lines in Fig. 3, and operates as a brake to check the speed of the travel of the vehicle, the balls or rollers H and H' then falling back in the lowermost portions of the inclined notches $g$ and $g'$ and thereby releasing the engagement of the wheel from the lever G, allows the vehicle to move freely subject only to the action of the brake-shoe K upon the pinion E.

On uprights L and L', secured to the bars C, I provide a seat M for the operator, who places his feet upon the front axle B and thereby guides the vehicle, while he operates the propelling mechanism by means of his hands on the lever I.

It is believed that from the foregoing description of the mechanism that its operation is so obvious that further reference thereto is unnecessary.

Therefore what I claim as new and desire to secure by Letters-Patent of the United States is:

1. The combination in a vehicle of a frame, an axle journaled thereon, a driving-wheel, corrugations on the inner surface of the rim thereof, levers mounted at the axis of said driving-wheel, shoulders on said levers having inclined notches therein, rollers or balls in the inclined notches in said levers adapted to engage the corrugations in the driving wheel rim, when the levers are moved in one direction, and disengage therefrom when moved in the opposite direction, a brake-shoe on one of said levers, an oscillating hand-lever, and means connecting each of said levers with said hand-lever whereby each lever is reciprocated by an oscillation of said hand-lever and the brake brought into operation by an extreme oscillation of the hand-lever in one direction, substantially as set forth.

2. The combination of a vehicle frame, a rear axle mounted in bearings therein, a gear pinion secured thereto, a geared driving wheel mounted in said frame and intermeshing with the geared pinion on said rear axle, corrugations on the inner surface of the rim of said driving wheel, levers mounted in said frame on a common axis with said driving wheel, mechanism on each of said levers engaging the corrugations in said driving wheel when such lever is moved in one direction, a brake-shoe on one of said levers adapted to be brought into engagement with the pinion on the rear axle, and a single operating lever connected with both of said levers on the driving wheel axis, and simultaneously moving both of said levers and operating to bring said brake-shoe into contact with said gear pinion when desired, substantially as set forth.

In testimony whereof I affix my signature, in presence of two witnesses.

CLARK F. THAYER.

Witnesses:
H. M. STURGEON,
JOHN B. BROOKS.